Figure 1:
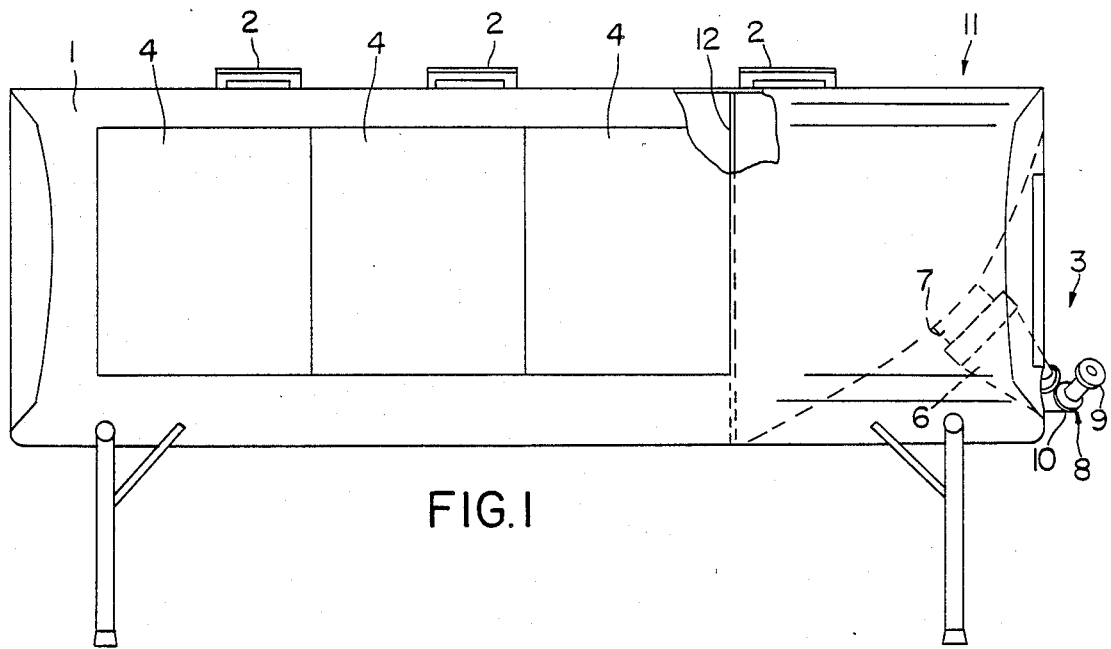

United States Patent [19]

Koskinen

[11] Patent Number: 4,909,556
[45] Date of Patent: Mar. 20, 1990

[54] TRANSPORT CONTAINER FOR THE TRANSPORT OF BULK MATERIAL

[76] Inventor: Tarmo Koskinen, Koskenpääntie 47, Jämsänkoski 42300, Finland

[21] Appl. No.: 101,661

[22] Filed: Sep. 22, 1987

[30] Foreign Application Priority Data

Nov. 25, 1985 [FI] Finland .................................. 854653

[51] Int. Cl.$^4$ ................................................ B60P 3/42
[52] U.S. Cl. ....................................... 296/10; 105/243; 105/359; 220/22; 222/630; 406/120; 406/127
[58] Field of Search .............. 222/608, 610, 626, 185, 222/263, 265, 266, 269, 270, 278, 279, 280, 330, 331, 373, 377, 426–428, 431, 450–453, 181, 630, 130; 105/311.1, 239, 359; 406/127, 124–126, 39, 139, 145, 120; 220/22, 22.4, 22.5; 410/129; 296/10, 24, 183

[56] References Cited

U.S. PATENT DOCUMENTS

| | | | |
|---|---|---|---|
| 790,420 | 5/1905 | Bayard | 105/359 |
| 934,578 | 9/1909 | Stoller | 105/359 X |
| 1,371,877 | 3/1921 | Dukes | 105/239 |
| 1,815,403 | 7/1931 | Goebels | 406/120 |
| 1,935,843 | 11/1933 | Goebels | 406/120 X |
| 2,712,797 | 7/1955 | Woehrle et al. | |
| 2,723,862 | 11/1955 | Dalglish | |
| 3,051,502 | 8/1962 | Webster | |
| 3,087,759 | 4/1963 | Worster | 296/10 X |
| 3,105,721 | 10/1963 | Collins et al. | 406/120 X |
| 3,222,099 | 12/1965 | Swallert | 220/22 X |
| 3,514,151 | 5/1970 | Hacker | 220/22 X |
| 3,918,604 | 11/1975 | Kersten | 220/22 |
| 4,381,897 | 5/1983 | Arbeletche et al. | 406/127 X |
| 4,613,053 | 9/1986 | Kimura et al. | 220/22 |
| 4,627,629 | 12/1986 | O'Neill | 105/359 X |
| 4,678,389 | 7/1987 | Bonerb | 220/22 X |

FOREIGN PATENT DOCUMENTS

| | | | |
|---|---|---|---|
| 653422 | 3/1965 | Belgium | 296/10 |
| 82/00992 | 4/1982 | European Pat. Off. | 406/127 |
| 1207224 | 12/1965 | Fed. Rep. of Germany | |
| 2153217 | 10/1971 | Fed. Rep. of Germany | |
| 343831 | 3/1972 | Sweden | |
| 367807 | 6/1974 | Sweden | |
| 0579208 | 11/1977 | U.S.S.R. | 406/120 |
| 1100139 | 11/1965 | United Kingdom | |
| 2038786 | 7/1980 | United Kingdom | 222/626 |
| 8200992 | 4/1982 | United Kingdom | |

Primary Examiner—Kevin P. Shaver
Attorney, Agent, or Firm—Barnes & Thornburg

[57] ABSTRACT

Transport container for the transport of bulk material provided with a filling-hole in the upper part and an emptying device in the rear. For the loading and unloading of also parcelled goods the container is provided with a side section that can be opened, and that the emptying device comprises a pneumatic pressure discharger with a pressure vessel into which the bulk material can freely flow from the container through a check valve and in which, with the check valve closed, pressure can be produced for discharging the bulk material through a discharge pipe.

5 Claims, 1 Drawing Sheet

TRANSPORT CONTAINER FOR THE TRANSPORT OF BULK MATERIAL

This invention is concerned with a transport container for the transport of bulk material provided with a filling-hole in the upper part and an emptying device in the rear.

All known transport containers of this kind are pressure vessels, in which positive pressure is produced for the unloading of the bulk material. This kind of transport container has the disadvantage that they are suitable for the transport of bulk material only. And since they are pressure vessels, they are also very costly to build.

The object of this invention is to remove the above-mentioned disadvantages. A transport container based on the invention is characterized by that for the loading and unloading of also parcelled goods the container is provided with a side section that can be opened, and that the emptying device comprises a pneumatic pressure discharger with a pressure vessel into which the bulk material can freely flow from the container through a check valve and in which, with the check valve closed, pressure can be produced for discharging the bulk material through a discharge pipe. Through this invention, the transport container can be used to transport bulk material in one direction and parcelled goods on the return journey. Since the container is emptied by means of a pneumatic pressure discharger, the transport container need not be a pressure vessel and is therefore much simpler and much more economical to build than the known transport containers in question.

An advantageous application of the invention is characterized by that the container is provided with two pressure dischargers and they are connected to a common discharge pipe, and that, by means of known technology, the pressure dischargers are arranged to work alternately. Thereby is achieved a continuous flow in the discharge pipe, which considerably speeds up the unloading of the transport container.

Another application of the invention is characterized by that the discharge pipes of the pressure dischargers are provided with check valves between the pressure dischargers and the common discharge pipe. Here, by means of known technology, the pressure dischargers are made to operate smoothly by alternately opening and closing the check valves and thus made to work alternately in unloading the bulk material.

Figure 2:
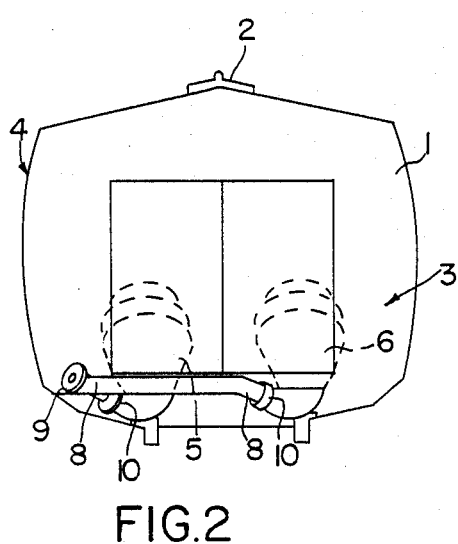
Figure 3:
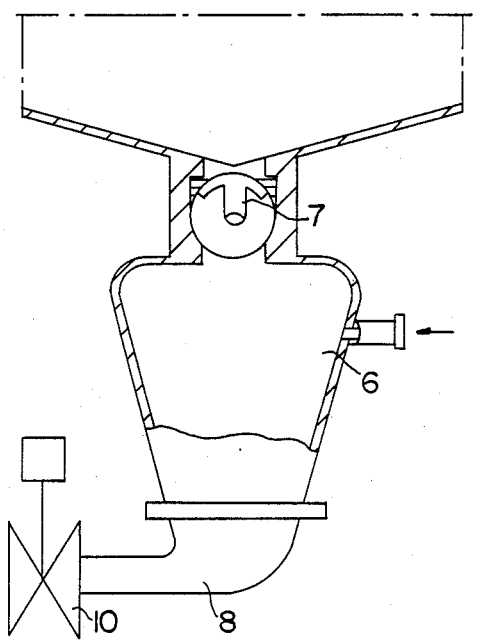

A third application of the invention is characterized by that in the container, in the space between the removable side section and the pressure dischargers there is a removable partition wall. It is thereby possible to transport bulk material and parcelled goods at the same time. Below, the invention is explained by means of an example, with reference to the following drawing where FIG. 1 shows a transport container from the side.
FIG. 2 shows a transport container from behind.
FIG. 3 shows a pneumatic pressure discharger in section.

In the upper part of the transport container 1 there are filling-holes 2 and in the rear there is an emptying device 3. For the loading and unloading of parcelled goods the container 1 is provided with a side section 4 that can be opened. The emptying device 3 comprises a pneumatic pressure discharger 5 with a pressure vessel 6 into which the bulk material can freely flow from the container 1 through a check valve 7. With the check valve 7 closed, it is possible to produce pressure in the pressure vessel 6 for discharging the bulk material through a discharge pipe 8. The container 1 is being tilted as the process of emptying goes on, and so the bulk material can freely flow into the emptying device 3. As the container is provided with two pressure dischargers 5 and they are connected to a common discharge pipe 9 and, by means of known technology, the pressure dischargers 5 are arranged to work alternately, a continuous discharge flow is achieved for the bulk material. The discharge pipes 8 of the pressure dischargers 5 are provided with check valves 10 between the pressure dischargers and the common discharge pipe. In the container 1, in the space 11 between the removable side section 4 and the pressure dischargers there is a removable partition wall 12 with which the container 1 can be divided into separate rooms for bulk-material and parcelled goods. The operations of the pressure dischargers 5 and those of the valves can be simply arranged by means of known technology, such as pneumatic arrangements. A transport container based on the invention can be used both on lorries and on railway wagons.

It is clear to a professional that the invention is not confined to the examples presented above, but can vary within the framework of the patent claims presented below. Consequently, the emptying device 3 need not necessarily be in the rear of the container, as in the example, but it can as well be under the container, especially with those containers that are used on railway wagons. The emptying device can also be a detachable unit, in which case it is suitable for the emptying of various other containers.

I claim:

1. Transport container for the transport of bulk material provided with a bulk material filling-hole in an upper part of the container and a bulk material emptying device in a rear part of the container, wherein for the loading and unloading of a parceled goods the container is provided with a side section that can be opened, and wherein the emptying device comprises:
   pressure vessel means incorporated into the transport container separate from a bulk material holding section of the container,
   pressure vessel inlet check valve means for selectively permitting gravity feed flow of bulk material from the bulk material holding section to the pressure vessel means, and
   pneumatic dispensing pressure applying means for applying dispensing pressure for discharging the bulk material through a discharge pipe with the pressure vessel inlet check valve means closed,
   a removable partition wall means provided in the container between the pressure vessel means and the side section of the container that can be opened for accommodating partitioning of the container into a parceled goods accommodating section bounded by the side section which can be opened and a bulk material holding section disposed adjacent the pressure vessel means,
   whereby the transport container can accommodate transport and dispensing of both bulk material and parceled goods without requiring that the container itself withstand the dispensing pressure,
   and wherein the container can alternatively be totally filled with either bulk material or parceled goods and the dispensing means can completely empty a full container of bulk material.

2. Transport container according to claim 1, wherein the pressure vessel means includes two separate pressure vessels connected to a common discharge pipe, and wherein the pneumatic dispensing pressure applying means includes means for selectively alternately applying discharge pressure to said respective pressure vessels.

3. Transport container according to claim 2, wherein each of said pressure vessels are connected to said common discharge pipe by respective separate vessel discharge pipes which are controlled by respective discharge check valves.

4. Transport container for the transport of bulk material provided with a bulk material filling-hole in an upper part of the container and a bulk material emptying device in a rear part of the container, wherein for the loading and unloading of a parceled goods the container is provided with a side section that can be opened, and wherein the emptying device comprises:
 pressure vessel means incorporated into the transport container separate from a bulk material holding section of the container,
 pressure vessel inlet check valve means for selectively permitting gravity feed flow of bulk material from the bulk material holding section to the pressure vessel means, and
 pneumatic dispensing pressure applying means for applying dispensing pressure for discharging the bulk material through a discharge pipe with the pressure vessel inlet check valve means closed,
 a removable partition wall means provided in the container between the pressure vessel means and the side section of the container that can be opened for accommodating partitioning of the container into a parceled goods accommodating section bounded by the side section which can be opened and a bulk material holding section disposed adjacent the pressure vessel means,
 whereby the transport container can accommodate transport and dispensing of both bulk material and parceled goods without requiring that the container itself withstand the dispensing pressure; and
 wherein a plurality of bulk material filling holes are provided on the tank container, at least one each of said bulk material filling holes being disposed to communicate with respective opposite sides of the removable partition wall means.

5. Transport container
 for the transport of bulk material provided with a bulk material filling-hole in an upper part of the container and a bulk material emptying device in a rear part of the container, wherein for the loading and unloading of a parceled goods the container is provided with a side section that can be opened, and wherein the emptying device comprises:
 pressure vessel means incorporated into the transport container separate from a bulk material holding section of the container,
 pressure vessel inlet check valve means for selectively permitting gravity feed flow of bulk material from the bulk material holding section to the pressure vessel means, and
 pneumatic dispensing pressure applying means for applying dispensing pressure for discharging the bulk material through a discharge pipe with the pressure vessel inlet check valve means closed,
 a removable partition wall means provided in the container between the pressure vessel means and the side section of the container that can be opened for accommodating partitioning of the container into a parceled goods accommodating section bounded by the side section which can be opened and a bulk material holding section disposed adjacent the pressure vessel means,
 whereby the transport container can accommodate transport and dispensing of both bulk material and parceled goods without requiring that the container itself withstand the dispensing pressure;
 wherein a plurality of bulk material filling holes are provided on the tank container, at least one each of said bulk material filling holes being disposed to communicate with respective opposite sides of the removable partition wall means; and
 wherein the pressure vessel means includes two separate pressure vessels connected to a common discharge pipe, and wherein the pneumatic dispensing pressure applying means includes means for selectively alternatively applying discharge pressure to said respective pressure vessels.

* * * * *